Jan. 3, 1933.　　　C. L. WAIT　　　1,893,462
AUTOMATIC VALVE
Filed July 27, 1931　　　3 Sheets-Sheet 1

Inventor
Charles L. Wait
By Clarence A. O'Brien
Attorney

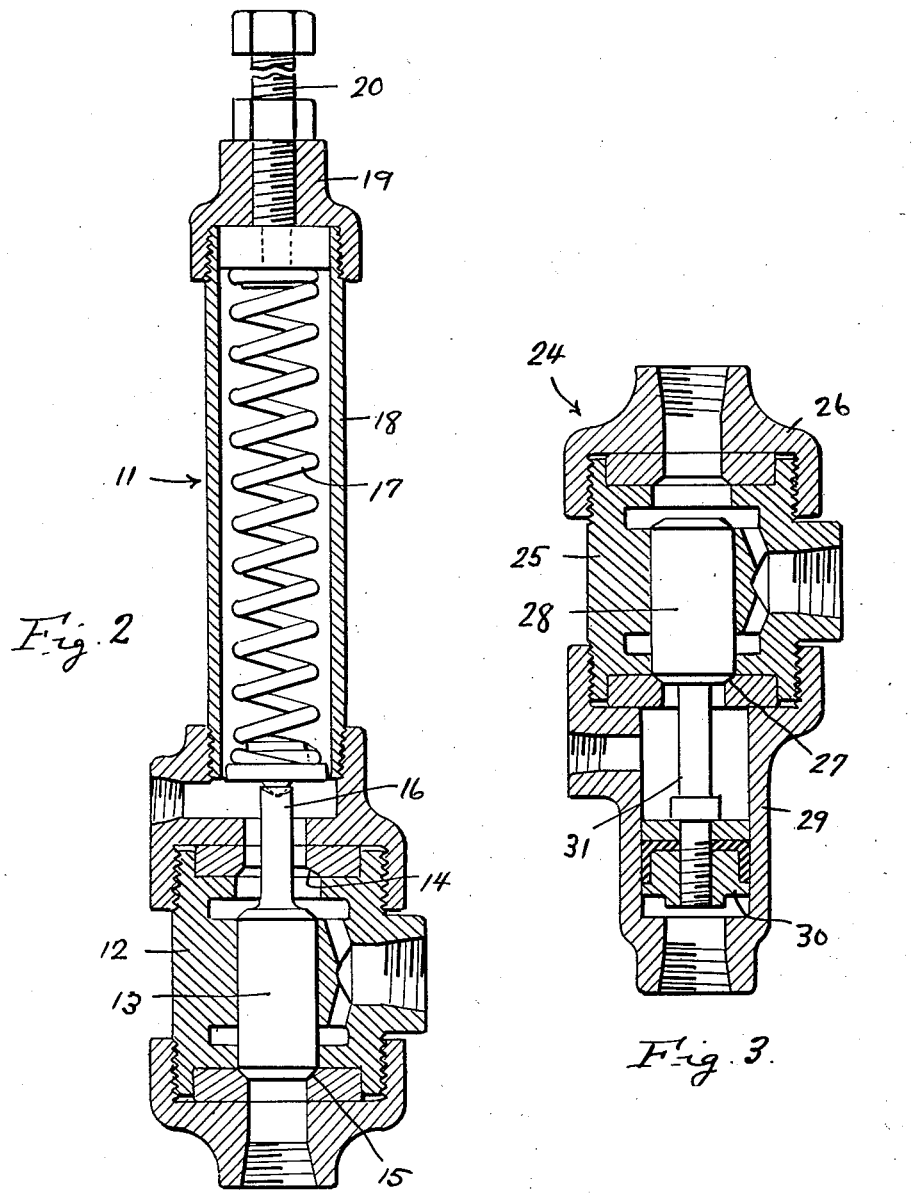

Patented Jan. 3, 1933

1,893,462

UNITED STATES PATENT OFFICE

CHARLES LEONARD WAIT, OF TULSA, OKLAHOMA

AUTOMATIC VALVE

Application filed July 27, 1931. Serial No. 553,432.

The present invention relates to an automatic valve for use in fluid pipe lines, either gas or liquid, and has for its principal object to provide, in a manner as hereinafter set forth, a valve of this character embodying a novel construction, combination and arrangement of parts whereby the same will be caused to automatically close when the pressure in the pipe line is materially reduced and which will automatically open when the pressure in said pipe line has been reestablished, but eliminating the excessive weight of the fluid should a rupture or large leak occur in the pipe line between two of the valves.

Other objects of the invention are to provide an automatic valve of the aforementioned character which will be simple in construction, strong, durable, efficient and reliable in operation and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:—

Figure 2 is a detail view in vertical section through the regulating valve constituting one of the essential units of the embodiment of the invention shown in Figure 1.

Figure 3 is a detail view in vertical section through the reversing valve which constitutes another essential unit of the embodiment of the invention shown in Figure 1.

Figure 1:
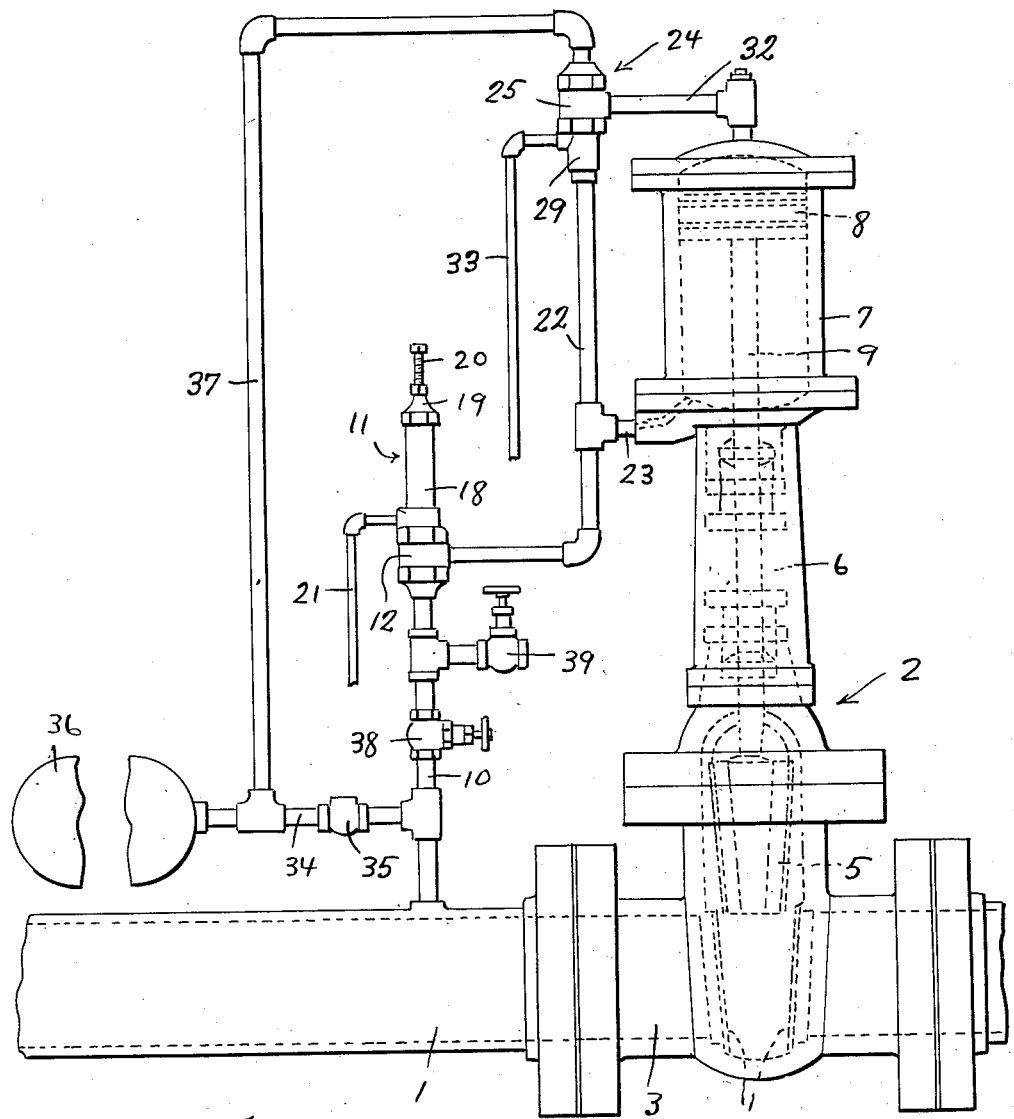
Figure 1 is a view in side elevation of a preferred embodiment of valve in accordance with the present invention, showing said valve in its open position.

Referring now to the drawings in detail, it will be seen that the reference numeral 1 designates a pipe line in which, at suitable points, the valve constituting this invention is interposed. The invention comprises what will be hereinafter referred to as the main valve designated generally by the reference numeral 2 and including a body 3 which is interposed in the pipe line 1. The body 3 has mounted therein the seats 4 with which a vertically reciprocable gate 5 is operatively engageable. A standard 6 is mounted on the body 3 and supports a cylinder 7 in which is disposed for reciprocation a piston 8. The gate 5 is operatively connected to the piston 8 for actuation thereby through the medium of a rod 9.

Connected with the pipe line 1 on the pressure side of the body 3 is a pipe 10 to the free end of which is connected what will be hereinafter referred to as the regulating valve designated generally by the reference numeral 11. As illustrated to advantage in Figure 2 of the drawings, the regulating valve 11 includes a body 12 in which is mounted for reciprocation a cylinder 13 constituting a valve having both ends formed for operative engagement with the upper and lower seats 14 and 15 respectively. A stem 16 projects longitudinally from one end of the valve cylinder 13 and operatively engaged with the free end of said stem is one end of a coil spring 17 which is disposed in a tubular housing 18 mounted on one end of the body 12. The upper end of the housing 18 is closed by a cap 19 through which an adjusting screw 20 is threaded and operatively engaged with the coil spring 17 for regulating the tension of said coil spring.

A drain pipe 21 is connected with the upper end portion of the body 12. A pipe 22 is connected with an intermediate portion of the body 12 and has communication with the cylinder 7 beneath the piston 8 through a branch 23. The cylindrical valve 13 provides means for establishing communication either between the pipes 10 and 22 or between the pipes 21 and 22.

What will be hereinafter referred to as the reversing valve is connected to the pipe 22 and is designated generally by the reference numeral 24. As best seen in Figure 3 of the drawings, the reversing valve 24 includes a body 25 having the seats 26 and 27 in its end portions with either of which a reciprocating cylindrical valve 28 is engageable, said cylindrical valve 28, of course, being slidably mounted in the body 25.

The body 25 of the reversing valve 24 is connected to the pipe 22 through the medium of a cylinder 29 in which is mounted for reciprocation a cup equipped piston 30. The cylindrical valve 28 is operatively connected to the piston 30 for actuation thereby through the medium of a stem 31 extending longitudinally from one end of the cylindrical valve 28 into the cylinder 29. The reversing valve 24 has communication with the cylinder 7 of the main valve 2 above the piston 8 through the medium of a pipe 32. A drain pipe 33 is connected with the reversing valve 24 at a point between the cylindrical valve 28 and the connection of the pipe 22 to said valve 24. The drain pipe 33 is connected with the cylinder 29 above or on the opposite side of the piston 30 to which the pipe 22 is connected to said cylinder 29.

Extending from the pipe 10 is a branch 34 in which is interposed a check valve 35. The branch 34 connects with a fluid pressure reservoir 36 and, in conjunction with the pipe 10, constitutes a supply pipe or means to said reservoir from the pipe line 1. A pipe 37 is connected to the branch 34 between the check valve 35 and the reservoir 36 and extends therefrom to the end of the valve 24 which is remote from the end of said valve with which the drain pipe 33 is connected. The cylindrical valve 28 constitutes means for establishing communication either between the pipes 32 and 33 or between the pipes 32 and 37. A manually operable shut off valve 38 is interposed in the pipe 10 between the branch 34 and the regulating valve 11 and also interposed in said pipe 10 between the shut off valve 38 and the regulating valve 11 is a manually operable drain valve 39.

In use, fluid under pressure from the pipe 1 passes through the pipe 10 and disengages the cylindrical valve 13 from the seat 15 and engages said cylindrical valve with the seat 14 against the tension of the spring 17. The fluid passes through the regulating valve 11, through the pipe 22 and into the cylinder 7 through the branch 23, thus raising the piston 8 and normally maintaining the gate in raised or open position. The fluid also passes through the pipe 22 into the cylinder 29 of the reversing valve 24, actuating the piston 30 in a manner to maintain the cylindrical valve 28 in engagement with the seat 26. The fluid also passes from the pipe 10 through the branch 34 past the check valve 35 into the reservoir 36.

Should pressure in the pipe line 1 be materially reduced, the coil spring 17 will actuate the cylindrical valve 13 in a manner to disengage the same from the seat 14 and to engage said cylindrical valve with the seat 15, thus establishing communication between the pipe 22 and the drain valve 21. In this manner the fluid pressure is reduced and said fluid is exhausted from the cylinders 7 and 29 in a manner to permit downward movement of the pistons 8 and 30, respectively. Then fluid under pressure from the reservoir 36 passes through the pipe 37 to the reversing valve 24 and disengages the cylindrical valve 28 from the seat 26 and engages said cylindrical valve 28 with the seat 27, thus breaking communication between the pipe 32 and the drain pipe 33 and establishing communication between the pipes 32 and 37, permitting the fluid under pressure to enter the cylinder 7 above the piston 8, thus forcing said piston 8 downwardly and engaging the gate 5 on the seats 4.

When pressure is reestablished in the pipe line 1, the cylindrical valve 13 is again engaged with the seat 14 thus interrupting communication between the pipes 22 and 21 and again establishing communication between the pipes 10 and 22. The fluid under pressure again enters the cylinder 7 and the cylinder 29, raising the pistons 8 and 30, thus disengaging the gate 5 from the seats 4. When the fluid under pressure re-enters the cylinder 29 from the pipe 22, the cylindrical valve 28 is disengaged from the seat 27 and engaged with the seat 26, thus interrupting communication between the pipes 32 and 37, and again establishing communication between the pipes 32 and 33, thus permitting the fluid to exhaust from the cylinder 7 above the piston 8. The supply of fluid in the reservoir 36 is also replenished.

Should it be desired to operate the automatic valve manually for the purpose of testing the same or for other reasons, this may be easily accomplished by simply closing the shut off valve 38 and opening the drain valve 39, thus causing the automatic valve to function as though the pressure in the pipe line 1 were eliminated or materially reduced.

Figure 4:
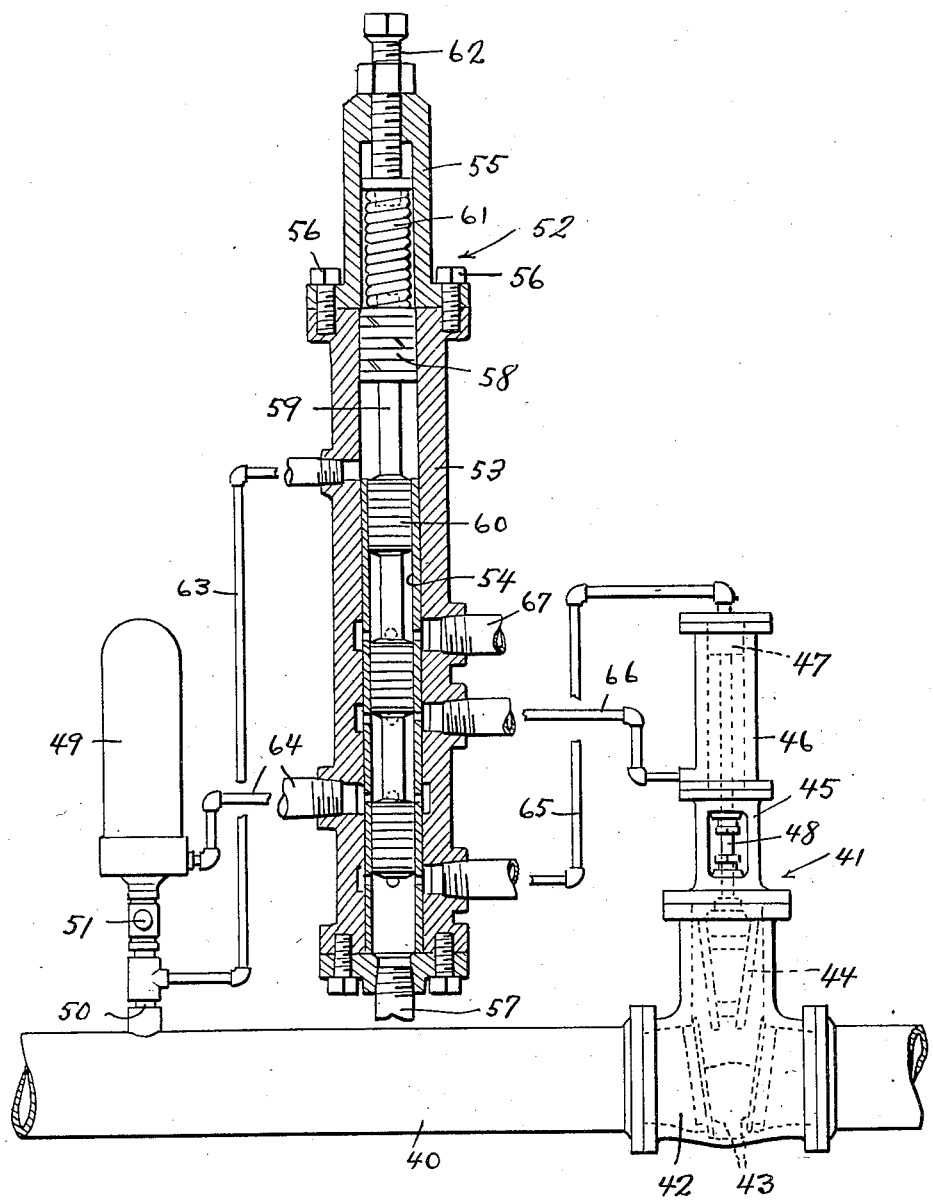
Figure 4 is a view partially in vertical section and partially in side elevation showing a modified form of the valve.

In the form of the invention illustrated in Figure 4 of the drawings, the pipe line is designated by the reference numeral 40 and interposed therein is what will be hereinafter referred to as the main valve designated generally by the reference numeral 41 and comprising a body 42 interposed in the pipe line 40. The body 42 is provided with the seats 43 with which a reciprocating gate 44 is operatively engageable. Mounted on the body 42 and depending therefrom is a standard 45 upon which is mounted a cylinder 46. A piston 47 is disposed for reciprocation in the cylinder 46 and the gate 44 is operatively connected to said piston 47 for actuation thereby through the medium of a rod 48. The rod 48 extends through the standard 45.

The reference numeral 49 designates a fluid pressure reservoir which is connected to the pipe line 40 on the pressure side of the main valve 41 by a pipe 50. A check valve 51 is interposed in the pipe 50.

The reference numeral 52 designates generally what will be hereinafter referred to as the pilot or control valve. This includes an elongated body 53 having a bushing or sleeve 54 extending a portion of the distance therethrough. A housing 55 is secured, as by bolts 56, to one end of the body 53. A drain pipe 57 is connected with the other end of the body 53.

Disposed for reciprocation in the end portion of the body 53 which is free of the bushing 54 is a piston 58 having extending from one end thereof a rod 59 upon which are fixed, at spaced points, the valves 60, said valves being of less diameter than the piston 58 and being disposed for reciprocation in the bushing 54. A coil spring 61 is disposed in the housing 55 and is operatively engaged with the piston 58 for yieldingly urging said piston in one direction the body 53. An adjusting screw 62 is threaded through the free end of the housing 55 and is operatively engaged with the coil spring 61 for regulating the tension of said coil spring.

A pipe 63 is connected with the pipe 50 between the check valve 51 and the pipe line 40 and said pipe 63 is connected with the body 53 at a point between the piston 58 and the adjacent valve 60. A pipe 64 has one end connected for communication with the body 53 at a point between the drain pipe 57 and the point at which the pipe 63 is connected to said body 63. The pipe 64 has its other end connected with the reservoir 49. Then, a pipe 65 has one end connected with the body 53 at a point between the drain pipe 57 and the point at which the pipe 64 is connected to said body and the other end of the pipe 65 is connected with the cylinder 46 at a point above the piston 47. A pipe 66 has one end connected with the body 53 at a point between the pipes 63 and 64 and has its other end connected with the cylinder 46 below the piston 47. Then, too, a drain pipe 67 is connected with the body 53 between the pipe 66 and the pipe 63.

In use, fluid under pressure passes into the body 53 through the pipe 63 and actuates the piston 58 against the tension of the coil spring 61 in a manner to dispose the valves 60 to establish communication between the pipes 64 and 66 and also between the pipes 65 and 57. Thus, fluid under pressure passes from the reservoir 49 into the cylinder 46 beneath the piston 47, thereby actuating said piston in a manner to maintain the gate 44 in raised or open position. Establishment of communication between the pipes 65 and 57 permits the fluid to exhaust from the cylinder 46 above the piston 47. Should pressure in the pipe line 40 be materially reduced or eliminated, thereby reducing the pressure in the body 53 beneath the piston 58, said piston will be actuated by the coil spring 61 to dispose the valves 60 to interrupt communication between the pipes 64 and 66 and between the pipes 56 and 57. This movement of the piston 58 under impulsion by the coil spring 61 establishes communication between the pipes 64 and 65, thus introducing fluid under pressure into the cylinder 46 above the piston 47 from the reservoir 49. This movement of the piston 58 also establishes communication between the pieces 66 and 67, thus permitting the fluid to be exhausted from the cylinder 46 beneath the piston 47 and the said piston 47 is thus moved downwardly to engage the gate 44 on the seats 43 for closing the pipe line 40.

It is believed that the many advantages of an automatic valve in accordance with this invention will be readily understood, and although the preferred embodiments of the invention are as illustrated and described, it is to be understood that further changes in the details of construction and in the combination and arrangement of parts may be resorted to which will fall within the scope of the invention as claimed.

What is claimed is:—

1. In a structure of the class described, a pipe line having a control member, a cylinder having a piston operatively connected to said control member, a reservoir connected to said pipe line, a connection between said reservoir and said cylinder, a valve having means for selectively venting the cylinder and establishing communication between the cylinder and the reservoir, and a check valve between said pipe line and said reservoir.

2. In a structure of the class described, a pipe line having a control member, a cylinder having a piston operatively connected to said control member, a reservoir connected to said pipe line, a connection between said reservoir and said cylinder, and a valve having means for selectively venting the cylinder and establishing communication between the cylinder and the reservoir, a connection between said pipe line and said valve and embodying a second valve having means for selectively establishing communication between said pipe line and the first named valve and between the cylinder and a point of discharge.

3. In a structure of the class described, a pipe line having a control member, a cylinder having a piston operatively connected to said control member, a reservoir connected to said pipe line, a connection between said reservoir and said cylinder, and a valve having means for selectively venting the cylinder and establishing communication between the cylinder and the reservoir, a connection between said pipe line and said valve and embodying a second valve having means for selectively establishing communication between said pipe line and the first named valve and between the cylinder and a point of discharge, a check valve between said pipe lines and said reservoir.

In testimony whereof I affix my signature.

CHARLES LEONARD WAIT.